(12) United States Patent
Iida et al.

(10) Patent No.: US 8,211,507 B2
(45) Date of Patent: Jul. 3, 2012

(54) METHOD FOR PRODUCING THERMOPLASTIC RESIN FILM

(75) Inventors: Seiichiro Iida, Ibaraki (JP); Hisashi Tani, Ibaraki (JP)

(73) Assignee: Yupo Corporation, Tokyo (JP)

( * ) Notice: Subject to any disclaimer, the term of this patent is extended or adjusted under 35 U.S.C. 154(b) by 925 days.

(21) Appl. No.: 10/927,096

(22) Filed: Aug. 27, 2004

(65) Prior Publication Data

US 2005/0085579 A1    Apr. 21, 2005

Related U.S. Application Data

(63) Continuation of application No. PCT/JP03/02203, filed on Feb. 27, 2003.

(30) Foreign Application Priority Data

Feb. 27, 2002    (JP) .................................. 2002-51543

(51) Int. Cl.
- H05H 1/00 (2006.01)
- B05D 3/06 (2006.01)
- B32B 5/16 (2006.01)
- B32B 27/08 (2006.01)

(52) U.S. Cl. ........ 427/532; 427/533; 428/323; 428/331; 428/335; 428/476.3; 428/516; 156/229

(58) Field of Classification Search .......... 427/532, 427/533; 264/129, 171.23; 428/323, 335, 428/473.5, 476.3, 327, 331, 516, 129
See application file for complete search history.

(56) References Cited

U.S. PATENT DOCUMENTS

| | | | | |
|---|---|---|---|---|
| 3,286,009 A | * | 11/1966 | Hashimoto et. al. | 264/129 |
| 4,472,227 A | * | 9/1984 | Toyoda et al. | 156/244.11 |
| 4,663,216 A | * | 5/1987 | Toyoda et al. | 428/212 |
| 4,906,526 A | * | 3/1990 | Inoue et al. | 428/473.5 |
| 5,441,802 A | * | 8/1995 | Mizuno et al. | 428/327 |
| 6,217,687 B1 | * | 4/2001 | Shibata et al. | 156/82 |
| 6,586,106 B2 | * | 7/2003 | Shibuya et al. | 428/474.4 |

FOREIGN PATENT DOCUMENTS

| | | |
|---|---|---|
| EP | 0 813 955 A2 | 12/1997 |
| EP | 0 834 528 A2 | 4/1998 |
| EP | 0 947 544 A2 | 10/1999 |
| JP | 46-40794 | 12/1971 |
| JP | 49-1782 | 1/1974 |
| JP | 56-118437 | 9/1981 |
| JP | 57-12642 | 1/1982 |
| JP | 57-56224 | 4/1982 |
| JP | 58-17123 | 2/1983 |
| JP | 60-229751 | 11/1985 |
| JP | 4-107127 | 4/1992 |
| JP | 7-266417 | 10/1995 |
| JP | 11-286559 | 10/1999 |
| JP | 11-342534 | 12/1999 |
| JP | 2000-1554 | 1/2000 |
| JP | 2000-233478 | 8/2000 |
| JP | 2001-138457 | 5/2001 |
| JP | 2001-191462 | 7/2001 |
| JP | 2002-144515 | 5/2002 |

* cited by examiner

*Primary Examiner* — Timothy Meeks
*Assistant Examiner* — Cachet Sellman
(74) *Attorney, Agent, or Firm* — Oblon, Spivak, McClelland, Maier & Neustadt, L.L.P.

(57) ABSTRACT

Disclosed is a method for producing a thermoplastic resin film, which comprises oxidizing the surface of a thermoplastic resin film (i) that contains an unsaturated carboxylic acid-modified polyolefin-based resin, then applying a surface modifier thereto, and stretching it. According to the method, thermoplastic resin films can be produced that have good adhesiveness between the film substrate and the coating layer thereof and have good printability and electrostatic resistance.

17 Claims, No Drawings

METHOD FOR PRODUCING THERMOPLASTIC RESIN FILM

This application is a continuation of International Application PCT/JP03/02203 filed on Feb. 27, 2003.

BACKGROUND OF THE INVENTION

1. Field of the Invention

The present invention relates to a method for producing thermoplastic resin films useful for prints, posters, stickers, decorations, etc. More precisely, the invention relates to a method for producing thermoplastic resin films that have good adhesiveness between the coating layer and the film substrate thereof and have good printability and electrostatic resistance.

2. Description Of The Background

In conventional stickers for outdoor advertisement and labels to be stuck to frozen food containers, the coated paper serving as the base of the stickers and labels is poorly resistant to water, and therefore, the surface of the coated paper is further coated with a plastic film for the base for them. Recently, water-resistant thermoplastic films, especially polyolefin-type synthetic papers have become specifically noticed as hopeful label materials that are substitutable for plastic film-coated papers (e.g., JP-B 46-40794 and 49-1782; JP-A-56-118437, 57-12642 and 57-56224).

However, the polyolefin-type synthetic papers are not always satisfactory in point of the printability and the processability thereof since their material, polyolefin is nonpolar. In general, therefore, they are subjected to suitable surface treatment before use. For example, one method known for producing polyolefin synthetic papers comprises oxidizing the surface of unstretched films through corona-discharging treatment, then coating the films with a coating liquid, stretching them and optionally further oxidizing their surface through corona-discharging treatment.

JP-A-7-266417 discloses a method for producing laminate resin films, which comprises applying corona treatment of from 30 to 100 w·min/m² to a film stretched in the machine direction thereof, coating it with a coating liquid of an ethylene-vinyl alcohol copolymer having an ethylene content of from 20 to 45 mol %, drying it, then stretching it in the cross directionthereof in a tenter, and further applying thereto corona treatment of from30to 100 w·min/m². However, the laminate resin film produced according to the method is problematic in that the adhesiveness between the substrate and the coating layer thereof is low, and, in addition, it has another problem in point of the safety and sanitation thereof since the coating liquid for it contains an organic solvent. Accordingly, it is desired to improve the film in these points.

JP-A-11-342534 discloses a method of surface treatment of thermoplastic resin films, which comprises oxidizing a thermoplastic resin film, then coating it with a coating liquid of polyethylenimine, and stretching it. The method solves the problem of safety and sanitation since the coating liquid used is an aqueous solution, but has another problem in that its printing compatibility is not good because of the probability that the adhesiveness between the film substrate and the coating layer may be low. Therefore, it is desired to improve the method in this point.

An object of the present invention is to provide a method for producing thermoplastic resin films that have good adhesiveness between the film substrate and the coating layer thereof and have good printability and electrostatic resistance.

SUMMARY OF THE INVENTION

The invention provides a method for producing a thermoplastic resin film, which comprises oxidizing the surface of a thermoplastic resin film (i) that contains an unsaturated carboxylic acid-modified polyolefin-based resin, then applying a surface modifier thereto, and stretching it.

In the invention, the thermoplastic resin film (i) is preferably a multi-layered resin film that comprises a substrate layer (ii) of a thermoplastic resin and, formed on at least one face of the substrate layer (ii), a surface layer (iii) of the thermoplastic resin that contains an unsaturated carboxylic acid-modified polyolefin-based resin. Also preferably, the thermoplastic resin film (i) is a multi-layered resin film that comprises a substrate layer (ii) of a thermoplastic resin stretched in the machine direction thereof and, formed on at least one face of the substrate layer (ii), a surface layer (iii) of the thermoplastic resin that contains an unsaturated carboxylic acid-modified polyolefin-based resin.

Preferably, the unsaturated carboxylic acid of the unsaturated carboxylic acid-modified polyolefin-based resin is one or a mixture of two or more selected from acrylic acid, methacrylic acid, maleic acid, fumaric acid, itaconic acid, maleic anhydride and itaconic anhydride, more preferably maleic acid or maleic anhydride. Also preferably, the polyolefin-based resin of the unsaturated carboxylic acid-modified polyolefin-based resin is one or a mixture of two or more selected from polyethylene, polypropylene, polybutene-1, ethylene-vinyl acetate copolymer and ethylene-propylene copolymer, more preferably polypropylene.

Also preferably, the degree of modification with unsaturated carboxylic acid of the unsaturated carboxylic acid-modified polyolefin-based resin for use in the invention is from 0.01 to 10% by weight. When the thermoplastic resin film (i) is a single-layered film, then the acid content thereof represented by the following formula is preferably from 0.01 to 1.0% by weight.

Acid Content (wt. %)=$M \times S/100$, wherein,

M indicates the unsaturated carboxylic acid-modified polyolefin content (wt. %) of the thermoplastic resin film (i);

S indicates the degree of modification with unsaturated carboxylic acid (wt. %).

When the thermoplastic resin film (i) is a multi-layered film, then the acid content of the surface layer (iii) thereof represented by the following formula is preferably from 0.01 to 1.0% by weight.

Acid Content (wt. %)=$H \times S/100$, wherein,

H indicates the unsaturated carboxylic acid-modified polyolefin content (wt. %) of the surface layer (iii);

S indicates the degree of modification with unsaturated carboxylic acid (wt. %).

Preferably, the thermoplastic resin film (i) in the invention contains an inorganic fine powder and/or an organic filler. Also preferably, the thermoplastic resin film (i) is of a polyolefin-based resin, more preferably a propylene-based resin.

Preferably, the oxidation treatment in the invention is at least one treatment selected from corona-discharging treatment, flame treatment, plasma treatment, glow-discharging treatment and ozone treatment.

Preferably, the surface modifier for use in the invention contains one or more polymer binders selected from polyethylenimine polymer, polyurethane polymer, polyacrylate copolymer and polyester copolymer, also preferably containing an antistatic polymer.

BEST MODE FOR CARRYING OUT THE INVENTION

The method of the invention is described in detail hereinunder, which comprises oxidizing the surface of a thermoplastic resin film (i) that contains an unsaturated carboxylic acid-modified polyolefin-based resin, then applying a surface modifier thereto, and stretching it. In this description, the numerical range expressed by the wording "a number to another number" means the range that falls between the former number indicating the lowermost limit of the range and the latter number indicating the uppermost limit thereof.
[Unsaturated Carboxylic Acid-Modified Polyolefin-Based Resin]

In the invention, an unsaturated carboxylic acid-modified polyolefin-based resin is contained in the surface layer of the thermoplastic resin substrate to thereby improve the adhesiveness between the film substrate and the coating layer of the film.

The unsaturated carboxylic acid-modified polyolefin-based resin for use in the invention is preferably produced through graft copolymerization of a polyolefin-based resin with an unsaturated carboxylic acid.

For graft copolymerization of a polyolefin-based resin with an unsaturated carboxylic acid, employable is a method comprising dissolving or suspending a polyolefin-based resin in an organic solvent, then adding an unsaturated carboxylic acid thereto, heating it up to a decomposition point (generally 50 to 150° C.) of a radical generator, and adding thereto a radical generator little by little to attain graft reaction.

Also employable is a method of heating a polyolefin-based resin and a graft monomer unsaturated carboxylic acid along with a radical generator in an extruder at 150 to 260° C. to attain graft polymerization.

In this description, the term "unsaturated carboxylic acid" is meant to indicate a concept that includes not only unsaturated compounds having a —COOH group but also their derivatives such as esters and acid anhydrides. The unsaturated carboxylic acid includes, for example, free unsaturated carboxylic acids such as acrylic acid, methacrylic acid, maleic acid, fumaric acid, itaconic acid; unsaturated carboxylates such as methyl methacrylate, methyl acrylate, butyl fumarate; and acid anhydrides such as maleic anhydride, itaconic anhydride. Above all, preferred are acrylic acid, methacrylic acid, maleic acid, fumaric acid, itaconic acid, maleic anhydride and itaconic anhydride; and more preferred are maleic acid and maleic anhydride.

The olefinic resin includes, for example, polyethylene, polypropylene, polybutene-1, poly-4-methylpentene-1, ethylene-propylene copolymer, ethylene-butene-1 copolymer, ethylene-hexene-1 copolymer, ethylene-4-methylpentene-1 copolymer, ethylene-octene-1 copolymer, propylene-butene-1 copolymer, propylene-hexene-1 copolymer, propylene-4-methylpentene-1 copolymer, propylene-ethylene-octene-1 copolymer, ethylene-butadiene copolymer, ethylene-vinyl acetate copolymer, ethylene-ethyl acrylate copolymer, ethylene-methyl acrylate copolymer, ethylene-acrylic acid copolymer, ethylene-methacrylic acid copolymer. Above all, preferred are polyethylene, polypropylene, polybutene-1, ethylene-vinyl acetate copolymer, ethylene-propylene copolymer; and more preferred is polypropylene.

Preferably, the thus-obtained, unsaturated carboxylic acid-modified polyolefin-based resin is grafted with from 0.01 to 10% by weight of unsaturated carboxylic acid units. If the unsaturated carboxylic acid unit content thereof is smaller than 0.01% by weight, then the effect of the unsaturated carboxylic acid-modified polyolefin-based resin will be unsatisfactory; but if larger than 10% by weight, then the molecular weight of the backbone polymer may reduce owing to the graft polymerization and the processability of the resin to be films may worsen.
[Thermoplastic Resin Film (i)]

The thermoplastic resin for use in the thermoplastic resin film (i) includes polyolefin-based resins, for example, ethylenic resins such as high-density polyethylene, middle-density polyethylene, and propylenic resins; polymethyl-1-pentene, ethylene-cyclic olefin copolymers; polyamide resins such as nylon-6, nylon-6,6, nylon-6,10, nylon-6,12; thermoplastic polyester resins such as polyethylene terephthalate and its copolymers, polyethylene naphthalate, aliphatic polyesters; and other thermoplastic resins such as polycarbonates, atacticpolystyrene, syndiotacticpolystyrene, polyphenylene sulfide. Two or more of these may be combined for use herein.

Of those thermoplastic resins, more preferred are non-polarpolyolefin-based resins for more remarkably attaining the effect of the invention. Of polyolefin-based resins, more preferred are propylenic resins in view of the chemical resistance and the cost thereof.

The propylenic resins include propylene homopolymers that are isotactic or syndiotactic and have a different degree of stereospecificity; and propylene-based copolymers with α-olefin such as ethylene, butene-1, hexene-1, heptene-1,4-methylpentene-1. The copolymers may be binary, ternary or quaternary ones, and may also be random copolymers or block copolymers.

The propylene homopolymer, if used herein, is preferably mixed with from 2 to 25% by weight of a resin having a melting point lower than that of the propylene homopolymer, such as polyethylene or ethylene-vinyl acetate copolymer, for bettering the stretchability of the resin film.

The thermoplastic resin film (i) may have a single-layered structure, or may have a two-layered structure of a substrate layer (ii) and a surface layer (iii), or a three layered structure having a surface layer (iii) on both faces of a substrate layer (ii), or a multi-layered structure having any other resin film layer between a substrate layer (ii) and a surface layer (iii).

When the plastic resin film (i) is a single-layered film, then the acid content thereof represented by the following formula is preferably from 0.01 to 1.0% by weight.

$$\text{Acid Content (wt. \%)} = M \times S/100,$$

wherein,

M indicates the unsaturated carboxylic acid-modified polyolefin content (wt. %) of the thermoplastic resin film (i);

S indicates the degree of modification with unsaturated carboxylic acid (wt. %).

When the thermoplastic resin film (i) is a multi-layered film, then the acid content thereof represented by the following formula is preferably from 0.01 to 1.0% by weight.

$$\text{Acid Content (wt. \%)} = H \times S/100,$$

wherein,

H indicates the unsaturated carboxylic acid-modified polyolefin content (wt. %) of the surface layer (iii);

S indicates the degree of modification with unsaturated carboxylic acid (wt. %).

If the acid content is smaller than 0.01% by weight, then the adhesiveness between the substrate and the coating layer could not increase; but if larger than 1.0% by weight, then the effect may be saturated and, in addition, there may occur some negative influences in that the film may yellow and may be sticky.

Preferably, the thermoplastic resin film (i) may contain an inorganic fine powder or an organic filler, or may not contain it.

When the thermoplastic resin film (i) is a polyolefin-based resin film and is a single-layered film and when it contains an inorganic fine powder, then it is generally desirable that the film contains from 40 to 99.5% by weight of a poly olefin-based resin and an unsaturated carboxylic acid-modified polyolefin-based resin, and from 0.5 to 60% by weight of an inorganic fine powder.

When the thermoplastic resin film (i) is a multi-layered film and when the substrate layer (ii) and the surface layer (iii) thereof contain an inorganic fine powder, then it is generally desirable that the substrate layer (ii) contains from 40 to 99.5% by weight of a polyolefin-based resin and from 0.5 to 60% by weight of an inorganic fine powder, and the surface layer (iii) contains from 25 to 100% by weight of a polyolefin-based resin and an unsaturated carboxylic acid-modified polyolefin-based resin and from 0 to 75% by weight of an inorganic fine powder.

If the content of the inorganic fine powder in the single-layered film or in the substrate layer (ii) of the multi-layered film is over 60% by weight, then the resin film may readily break when it is first stretched in the machine direction and then in the cross direction thereof. If the content of the inorganic fine powder in the surface layer (iii) is over 75% by weight, then the surface strength of the surface layer stretched in the cross direction thereof will be low and the stretched film may be readily torn.

The inorganic fine powder includes calcium carbonate, calcined clay, silica, diatomaceous earth, talc, titanium oxide, barium sulfate, alumina. The powder for use in the invention preferably has a mean particle size of from 0.01 to 15 μm, more preferably from 0.2 to 7 μm. The powder having a mean particle size of smaller than 0.01 μm may cause some troubles of classification or aggregation in mixing it with a thermoplastic resin; but that having a mean particle size of larger than 15 μm may cause appearance failure such as fish eyes.

When the thermoplastic resin film is a polyolefin-based resin film, then the organic filler to it may be polyethylene terephthalate, polybutylene terephthalate, polycarbonate, nylon-6, nylon-6,6, cyclic olefin polymer or the like having a melting point (e.g., 170 to 300° C.) or a glass transition temperature (e.g., 170 to 280° C.) higher than the melting point of the polyolefin-based resin.

If desired, the resin film may contain a heat stabilizer, a light stabilizer, a dispersant and a lubricant. Concretely, the resin film may contain from 0.001 to 1% by weight of a heat stabilizer of, for example, steric-hindered phenols, phosphorus-containing compounds or amines, from 0.001 to 1% by weight of a light stabilizer of, for example, steric-hindered amines, benzotriazoles or benzophenones, and from 0.01 to 4% by weight of a dispersant for inorganic fine powder of, for example, silane coupling agents, higher fatty acids such as oleic acid and stearic acid, metal soap, polyacrylic acids, polymethacrylic acids and their salts.

[Formation of Resin Film]

Not specifically defined, various known methods may be employed for forming the thermoplastic resin film (i). Concretely, herein employable are casting, calendering, rolling or inflation that comprises sheet-wise extruding a resin melt through a single-layered or multi-layered T-die or I-die connected to a screw extruder; removal of solvent or oil after casting or calendering of a mixture of thermoplastic resin and organic solvent or oil; and film formation from a solution of thermoplastic resin followed by solvent removal from the films formed.

In case where the films are stretched, various known methods may be employed for it. Concretely, herein employable are machine-direction stretching to be attained by the peripheral speed difference between rolls, and cross-direction stretching to be attained in a tenter oven.

[Resin Film]

For the thermoplastic resin film (i), used is thermoplastic resin, and the film may be or may not be stretched. However, the film must be stretchable after its surface treatment. The film may or may not contain an inorganic fine powder and/or an organic filler. The film may have a non-stretched resin layer formed on at least one face of the stretched substrate layer thereof.

In case where the thermoplastic resin film (i) is a polyolefin-based resin film and when it is a single-layered film and contains an inorganic fine powder, then it is desirable that the resin film is fabricated by monoaxially or biaxially stretching a resin film of a resin composition that contains, for example, from 40 to 99.5% by weight of a polyolefin-based resin, from 0.5 to 60% by weight of an inorganic fine powder, and from 1 to 50% by weight of an unsaturated carboxylic acid-modified polyolefin-based resin, at a temperature lower than the melting point of the constituent component, polyolefin-based resin, preferably at a temperature lower than that temperature by 3 to 60° C. to give a porous, stretched resin film that has fine cracks in its surface and has fine voids inside it. Another preferred embodiment of fabricating the thermoplastic resin film (i) that has a multi-layered structure is as follows: A resin film of a resin composition that contains from 40 to 100% by weight of a polyolefin-based resin and from 0 to 60% by weight of an inorganic fine powder is stretched in the machine direction thereof at a temperature lower than the melting point of the constitutive polyolefin-based resin, preferably at a temperature lower than that temperature by 3 to 60° C. to form a substrate layer (ii), and then a surface layer (iii) of a resin film of a resin composition that contains from 25 to 99% by weight of a polyolefin-based resin, from 0 to 75% by weight of an inorganic fine powder and from 1 to 80% by weight of an unsaturated carboxylic acid-modified polyolefin-based resin is laminated on at least one face of the substrate layer (ii). Thus constructed, the film is subjected to surface treatment in the invention.

The thickness of the resin film that is subjected to the surface treatment in the former stage of the invention may be suitably determined depending on the draw ratio thereof and on the necessary thickness of the stretched film. In general, it may be from 20 to 4000 μm, preferably from 100 to 3000 μm.

[Surface Oxidation]

For the surface oxidation of the substrate, preferred is at least one selected from corona-discharging treatment, flame treatment, plasma treatment, glow-discharging treatment and ozone treatment. More preferred are corona treatment and flame treatment. The treatment dose in corona treatment may be from 600 to 12,000 J/m$^2$ (10 to 200 W·min/m$^2$), preferably from 1,200 to 9,000 J/m$^2$ (20 to 180 W·min/m$^2$). If it is lower than 600 J/m$^2$ (10 W·min/m$^2$), then the corona discharge treatment will be ineffective and the surface of the film will repel the surface modifier applied thereto in the subsequent step; but even if higher than 12,000 J/m$^2$ (180W·min/m$^2$), the effect of the treatment will not be augmented any more. Therefore, the treatment will be enough at 12,000 J/m$^2$ (180 W·min/m$^2$) or lower. The treatment dose in flame treatment may be from 8,000 to 200,000 J/m$^2$, preferably from 20,000 to 100,000 J/m$^2$. If it is lower than 8,000 J/m$^2$, then the flame treatment will be ineffective and the surface of the film will repel the surface modifier applied thereto in the subsequent step; but even if higher than 200,000 J/m$^2$, the effect of the treatment will not be augmented anymore. Therefore, the treatment will be enough at 200,000 J/m$^2$ or lower.

[Surface Modifier]

The surface modifier for use in the invention is preferably one or a mixture of two or more components selected from the following polymer binders. In view of the electrostatic resistance of the film, adding an antistatic polymer to the modifier is preferred; and from the viewpoint of improving the adhesiveness between the substrate and the coating layer, adding a crosslinking agent thereto is preferred.

<1> Polymer Binder:

For the polymer binder, preferred is an aqueous resin that is highly adhesive to unsaturated carboxylic acid-modified polyolefin-based resins and polyolefin-based resins and has good printing compatibility.

Examples of the polymer binder are water-soluble resins or water-dispersible resins, for example, polyethylenimine-type polymers such as polyethylenimine, C1-12 alkyl halide-modified polyethylenimine, poly(ethylenimine-urea), polyamine-polyamide/ethylenimine adduct, and polyamine-polyamide/epichlorohydrin adduct; acrylate-based polymers such as acrylamide-acylate copolymer, acrylamide-acrylate-methacrylate copolymer, polyacrylamide derivative, oxazoline group-containing acrylate polymer; polyvinylpyrrolidone, polyethylene glycol; as well as polyvinyl acetate, polyurethane, ethylene-vinyl acetate copolymer, polyvinylidene chloride, polypropylene chloride, acrylonitrile-butadiene copolymer, polyester. Of those, preferred are polyethylenimine-type polymers, polyurethane polymers, polyacrylate-based copolymers, and polyester polymers.

<2> Antistatic Polymer:

The antistatic polymer usable herein is any of cationic, anionic, ampholytic and nonionic polymers. Cationic polymers include those having an ammonium salt structure or a phosphonium salt structure. Anionic polymers include those having a molecular structure with an alkali metal salt of sulfonic acid, phosphoric acid or carboxylic acid, for example, an alkali metal salt of acrylic acid, methacrylic acid or maleic acid (anhydride) (e.g., lithium salt, sodium salt, potassium salt).

Ampholytic polymers are those having both the cationic structure and the anionic structure as above, in one molecule. Their examples are betaine-type polymers. Nonionic polymers include ethyleneoxide polymers having an alkyleneoxide structure, and polymers having an ethyleneoxide polymer segment in the molecular chain. In addition, polymers having boron in the molecular structure are also examples of the antistatic polymer for use herein.

Of those mentioned above, preferred are nitrogen-containing polymers; and more preferred are tertiary or quaternary nitrogen-containing acrylic polymers. Adding the antistatic polymer to the above-mentioned polymer binder may solve the problem of dust adhesion and static charge trouble in printing. The amount of the antistatic polymer may be from 1 to 200 parts by weight relative to 100 parts by weight of the polymer binder.

<3> Crosslinking Agent:

Adding a crosslinking agent to the polymer binder further improves the coating layer strength and the water resistance of the resin film. The crosslinking agent includes epoxy compounds such as glycidyl ether, glycidyl ester; epoxy resins, as well as isocyanate-based, oxazoline-based, formalin-based, hydrazide-based or carbodiimide-based water-dispersible resins. The amount of the crosslinking agent may be from 1 to 200 parts by weight relative to 100 parts by weight of the polymer binder.

<4> Pigment:

The ink fixer layer of the invention may contain a pigment component for improving the ink fixability thereon. The pigment component may comprise one or more selected from the inorganic fine powder and the organic filler mentioned hereinabove in the section of the substrate.

<5> Auxiliary Additives:

The ink fixer layer may further contain any other auxiliary additives such as surfactant, defoaming agent, water-soluble metal salt, etc.

[Formation of Surface-Modifying Layer]

The constituent components for the surface-modifying layer may be dissolved in water or a hydrophilic solvent such as methyl alcohol, ethyl alcohol or isopropyl alcohol. Preferably, they are used as aqueous solutions thereof. The solution concentration is generally from 0.05 to 20% by weight, preferably from 0.1 to 10% by weight or so. If the concentration is lower than 0.05% by weight, the step of drying the coating layer will have to be specifically planned, for example, by prolonging the drying time; but if higher than 20% by weight, the coating layer may be uneven.

Coating the films with the surface modifier may be effected by the use of a roll coater, a blade coater, a bar coater, an air knife coater, a size press coater, a gravure coater, a reverse coater, a die coater, a lip coater, a spray coater or the like. If desired, the coated films may be smoothed or dried to thereby remove any excess water or hydrophilic solvent.

The coating amount of the surface modifier is preferably from 0.005 to 10 g/m$^2$, more preferably from 0.01 to 1 g/m$^2$, even more preferably from 0.01 to 0.6 g/m$^2$ in terms of the dry solid content thereof. If it is smaller than 0.005 g/m$^2$, then the polymer binder will be ineffective; but if larger than 10 g/m$^2$, then the thickness difference between the coated substrate and the non-coated substrate will be great and the coated film will be difficult to uniformly stretch.

[Stretching]

For stretching the film, employable is any known method. Concretely, when the thermoplastic resin to form the film is an amorphous resin, then the resin film may be stretched at a temperature not lower than the glass transition point of the resin; but when it is a crystalline resin, then the resin film may be stretched at a temperature falling between the glass transition point of the amorphous part thereof and the melting point of the crystalline part thereof. The stretching temperature may be within a known temperature range suitable to the thermoplastic resin. The stretching mode may be any of machine-direction stretching to be attained by the peripheral speed difference between rolls, cross-direction stretching to be attained in a tenter oven, rolling, or simultaneous biaxial stretching to be attained by the combination of a tenter oven and a linear motor.

The draw ratio in stretching the film is not specifically defined, and it may be suitably determined depending on the properties of the thermoplastic resin used for the film. For example, when the thermoplastic resin is a propylene homopolymer or its copolymer and when the resin film is stretched in one direction, the draw ratio may be from about 1.2 to 12 times, preferably from about 2 to 10 times; but when the resin film is stretched biaxially, then the a real draw ratio thereof may be from 1.5 to 60 times, preferably from 10 to 50 times. When the film of other thermoplastic resin is stretched in one direction, the draw ratio maybe from 1.2 to 10 times, preferably from 2 to 5 times; and when it is stretched biaxially, then the a real draw ratio may be from 1.5 to 20 times, preferably from 4 to 12 times. If further desired, the stretched film may be subjected to heat treatment at high temperatures.

The stretching temperature is lower by from 2 to 60° C. than the melting point of the thermoplastic resin that forms the film to be stretched. When the resin is propylene homopolymer (melting point, 155to167° C.), then the resin film may be stretched at a temperature falling between 110 and 164° C.; when the resin is high-density polyethylene (melting point, 121 to 134° C.), then it may be stretched at a temperature falling between 110 and 120° C.; and when the resin is polyethylene terephthalate (melting point, 246 to 252° C.), then it may be stretched at a temperature falling between 104 and 115° C. Anyhow, the stretching temperature shall be suitably selected depending on the stretching process and condition employed. The pulling speed for the stretching may be from 20 to 350 m/min.

In case where the thermoplastic resin film contains an inorganic fine powder or an organic filler, then fine cracks may be formed in the film surface and fine voids may be inside the film.

After stretched, the thickness of the thermoplastic resin film is preferably from 20 to 500 μm, more preferably from 35 to 300 μm.

(Physical Properties of Stretched Film)

After stretched, the thermoplastic resin film has good properties, for example, having a porosity of its substrate, as represented by the formula mentioned below, of from 10 to 60%, a density of from 0.650 to 1.20 g/cm$^3$, an opacity of at least 75%, and a Beck smoothness of from 50 to 25,000 seconds.

$$\text{Porosity (\%)} = [(\rho 0 - \rho)/\rho 0] \times 100 \quad (1)$$

wherein ρ0 indicates the density of the unstretched resin film, and ρ indicates the density of the stretched resin film.

The thermoplastic resin film obtained according to the invention has good adhesiveness between the film substrate and the coating layer and has good printability, and therefore, it is useful not only for letterpress printing, gravure printing, flexographic printing, solvent-type offset printing, but also for UV-curable offset printing.

The characteristics of the invention are described more concretely with reference to the following Production Examples, Working Examples, Comparative Examples, and Test Examples. The material, the amount, the blend ratio, the treatment and the process employed in the following Examples may be varied in any desired manner not overstepping the sprit and the scope of the invention. Accordingly, the following Examples are not whatsoever intended to restrict the scope of the invention. In the blend ratio of constitutive components, "part" is by weight.

PRODUCTION EXAMPLE

Preparation of Surface Modifier

Surface modifiers G1 to G7 used in Examples and Comparative Examples are described below.

(G1) Polymer Binder Component 1, Modified Ethylenimine Polymer:

100 parts of an aqueous 25 wt. % solution of polyethylenimine "Epomin P-1000 (degree of polymerization 1600)" (Nippon Shokubai's trade name), 10 parts of glycidol and 10 parts of propylene glycol monomethyl ether were put into a four-neck flask equipped with a stirrer, a reflux condenser, a thermometer and a nitrogen gas inlet mouth, stirred in a nitrogen atmosphere and subjected to modification reaction at 80° C. for 16 hours to obtain an aqueous solution of glycidol-modified polyethylenimine. This was dried, and then analyzed through UV spectrometry, $^1$H-nuclear magnetic resonance spectrometry ($^1$H-NMR) and $^{13}$C-nuclear magnetic resonance spectrometry ($^{13}$C-NMR),which confirmed that the product had a structure formed through addition of the epoxy group of glycidol to the nitrogen atom of polyethylenimine, and concretely, 23% nitrogen of polyethylenimine reacted with glycidol.

(G2) Polymer Binder Component 2, Polyacrylate Copolymer:

This is a polyacrylate resin emulsion, "DICNAL WF-73H" (Dai-Nippon Ink Chemical Industry's trade name, having a solid concentration of 40% by weight).

(G3) Polymer Binder Component 3, Polyurethane Polymer:

This is a polyether-type polyurethane resin emulsion, "VONDIC 1040NS" (Dai-Nippon Ink Chemical Industry's trade name, having a solid concentration of 50% by weight).

(G4) Polymer Binder Component 4, Polyacrylate Copolymer:

This is a polyacrylate resin emulsion, "MOVINYL735" (trade name of Clariant Polymers K.K., having a solid concentration of 40% by weight).

(G5) Antistatic Polymer 1, Acrylate-Type Antistatic Polymer:

35 parts of dimethylaminoethyl methacrylate, 20 parts of ethylmethacrylate, 20 parts of cyclohexylmethacrylate, 25 parts of stearyl methacrylate, 150 parts of ethyl alcohol and 1 part of azobisisobutyronitrile were put into a four-neck flask equipped with a reflux condenser, a thermometer, a nitrogen-purging glass tube and a stirrer, and polymerized in a nitrogen atmosphere at 80° C. for 6 hours.

Next, 70 parts of a 60% solution of 3-chloro-2-hydroxypropylammonium chloride was added to it, and further reacted at 80° C. for 15 hours, and then ethyl alcohol was evaporated away while water was drained off. A quaternary ammonium salt-type copolymer (abbreviated as G5) having a final solid content of 30% by weight was thus obtained. This is an alkyl acrylate polymer having a group of the following formula in the molecular chain.

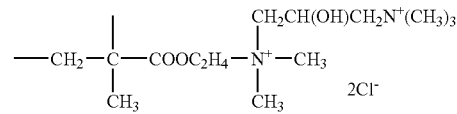

(G6) Crosslinking Component 1, Polyamine-Polyamide Derivative:

This is a polyamine-polyamide/epichlorohydrin adduct "WS-570 (solid content 12.5% by weight)" (Nippon PMC's trade name).

(G7) Pigment Component 1, Calcium Carbonate:

This is a light calcium carbonate, "Brilliant S-15" (trade name of Shiroishi Kogyo K.K.).

EXAMPLE 1

(1) Resin Sheet:

A composition (c') prepared by adding 15% by weight of calcium carbonate having a mean particle size of 1.5 μm [Bihoku Hunka Kogyo's Softon 1800] to a propylene homopolymer "Nippon Polychem Corporation's Novatec PP:EA8" having a melt flow rate (MFR) of 0.8 g/10 min was kneaded in an extruder set at 240° C., and then sheetwise extruded out, and cooled in a cooling device to give an unstretched sheet. To the composition sheetwise extruded out in the above, and to the compositions to be used for extrusion or lamination in the following, added were 0.05 parts, relative to 100 parts of the total of propylene homopolymer and calcium carbonate in the composition, of 3-methyl-2,6-di-t-butylphenol, 0.05 parts of a phenolic stabilizer, Irganox 1010 (Ciba-Geigy's trade name), and 0.05 parts of a phosphorus-containing stabilizer, Weston 618 (Borgwarner's trade name). The sheet was 5-fold stretched in the machine direction under heat at 140° C.

A composition (a') was prepared by mixing 90% by weight of propylene homopolymer "Nippon Polychem Corporation's Novatec PP:MA4" having MFR of 5.0 g/10 min and 10% by weight of maleic acid-modified polypropylene (having a degree of modification with maleic anhydride of 0.5% by weight); and a composition (b') was prepared by mixing 55% by weight of propylene homopolymer "Nippon Polychem Corporation's Novatec PP:MA4" having MFR of 5.0 g/10 min and 45% by weight of calcium carbonate having a mean particle size of 1.5 μm "Bihoku Hunka Kogyo's Softon 1800". A melt of the composition (a') prepared in an extruder set at 250° C. and a melt of the composition (b') prepared in a different extruder at 250° C. were laminated in a die, and the resulting laminate was co-extruded onto both faces of the 5-fold MD-stretched sheet that had been prepared in the above, in such a manner that the layer (a') could face outside to fabricate a 5-layered laminate (a'/b'/c'/b'/a') (this is hereinafter referred to as "P1").

(2) Oxidation:

The surface of the 5-layered laminate (P1) was subjected to corona discharging treatment with a corona surface treater (Kasuga Electric's HFS400F). Concretely, a silicone-coated roll was used for the treater roll, and the gap between the aluminium electrode and the roll was 2 mm. The line speed was about 30 m/min, and the applied energy density was 100 W·min/m².

(3) Application of Surface Modifier:

The surface modifier (G1) was applied to the corona-discharged surface of the sheet to such a degree that the dry weight thereof could be about 0.2 g/m². Thus coated, the sheet was then led into a tenter oven mentioned below.

(4) Stretching:

The 5-layered laminate that had been subjected to oxidation and coated with the surface modifier was heated in an tenter oven at 155° C., and then stretched 8.5 times in the cross direction to give a 5-layered laminate film having a thickness of 110 μm (thickness of each layer, 6 μm/23 μm/52 μm/23 μm/6 μm).

EXAMPLES 2 to 8

Five-layered laminate films were fabricated in the same manner as in Example 1, except that the surface modifier was changed to the composition as in Table 1.

EXAMPLE 9

A five-layered film was fabricated in the same manner as in Example 1, except that a composition (d') prepared by mixing 95% by weight of propylene. homopolymer "Nippon Polychem Corporation's Novatec PP:MA4" having MFR of 5.0 g/10 min and 5% by weight of maleic acid-modified polypropylene (having a degree of modification with maleic anhydride of 0.5% by weight) was used in place of the composition (a') in Example 1.

EXAMPLE 10

A five-layered film was fabricated in the same manner as in Example 1, except that a composition (e') prepared by mixing 45% by weight of propylene homopolymer "Nippon Polychem Corporation's Novatec PP:MA4" having of 5.0 g/10 min, 10% by weight of maleic acid-modified polypropylene (having a degree of modification with maleic anhydride of 0.5% by weight), and calcium carbonate having a mean particle size of 1.5 μm "Bihoku Hunka Kogyo's Softon 1800" was used in place of the composition (a') in Example 1.

EXAMPLE 11

A five-layered film was fabricated in the same manner as in Example 1, except that a composition (f') prepared by mixing 90% by weight of propylene homopolymer "Nippon Polychem Corporation's Novatec PP:MA4" having MFR of 5.0 g/10 min and 10% by weight of maleic acid-modified high-density polyethylene (having a degree of modification with maleic anhydride of 0.5% by weight) was used in place of the composition (a') in Example 1.

EXAMPLE 12

A five-layered film was fabricated in the same manner as in Example 1, except that a composition (g') prepared by mixing 90% by weight of propylene homopolymer "Nippon Polychem Corporation's Novatec PP:MA4" having MFR of 5.0 g/10 min and 10% by weight of maleic acid-modified ethylene-vinyl acetate copolymer (having a degree of modification with maleic anhydride of 0.5% by weight) was used in place of the composition (a') in Example 1.

COMPARATIVE EXAMPLE 1

Applying the surface modifier to the resin sheet of Example 1 was tried with no oxidation treatment of the sheet, but the surface modifier was repelled owing to the poor wettability of the sheet surface. Since the sheet could not be uniformly coated, this experiment was stopped.

COMPARATIVE EXAMPLE 2

A five-layered film was fabricated in the same manner as in Example 1, except that a composition (h') prepared by mixing 55% by weight of propylene homopolymer "Nippon Polychem Corporation's Novatec PP:MA4" having MFR of 5.0 g/10 min and 45% by weight of calcium carbonate having a mean particle size of 1.5 μm "Bihoku Hunka Kogyo's Softon 1800" was used in place of the composition (a') in Example 1.

COMPARATIVE EXAMPLE 3

A five-layered film was fabricated in the same manner as in Example 1, except that a composition (i') of 100% by weight of propylene homopolymer "Nippon Polychem Corporation's Novatec PP:MA4" having MFR of 5.0 g/10 min was used in place of the composition (a') in Example 1.

TEST EXAMPLE

The films of Examples 1 to 12 and Comparative Examples 1 to 3 were subjected to the following tests:
[Interlayer Adhesiveness]
The film is stored in an atmosphere at a temperature of 23° C. and a relative humidity of 50% for 3 days, and the its interlayer adhesion strength is measured with a bonding strength tester "Internal Bond Tester" (Kumagaya Riki Kogyo's trade name).

The principle of the interlayer adhesion strength measurement is as follows: An adhesive tape, Cellophane Tape is stuck to the coated face of the film, and an aluminium angle is stuck to the upper face of the thus-prepared sample. The lower face of the sample is set on a predetermined holder. A hammer is swung down on it at an angle of 90 degrees to thereby impart a shock to the aluminium angle, and the delamination energy of the sample is measured. The interlayer adhesion strength of 1.0 or more passes the test.

[Ink Transferability]

The film is stored in an atmosphere at a temperature of 23° C. and a relative humidity of 50% for 3 days. Using a printer "RI-III Model Printability Tester" (Akari Seisakusho's trade name), printing ink "Best SP (indigo)" (T & K Toka's trade name) is applied onto the coated face of the film to form thereon an ink layer having a thickness of 1.5 g/m². The printed sample is dried at room temperature for 24 hours. The Macbeth density of the printed face of the sample is measured with "Macbeth Densitometer" (US Colmogen's trade name). The Macbeth density of 1.5 or more passes the test. The Macbeth density of less than 1.5 is impracticable since the ink transferability is insufficient.

[Ink Adhesiveness]

Printing on the film is effected in the same manner as that for the ink transferability test as above. Using the bonding strength tester as above "Internal Bond Tester", the ink adhesiveness to the printed face of the sample is measured.

The ink adhesiveness of 1.0 kg·cm or more passes the test. The ink adhesiveness of less than 1.0 kg·cm is insufficient and impracticable.

[Evaluation of Water Resistance]

Printing on the film is effected in the same manner as that for the ink transferability test as above. The printed film is dipped in water at 23° C. for 3 hours. Still in water, this is folded with the printed face inside, and the thus-folded printed faces are rubbed 30 times/30 seconds to thereby evaluate the rubbing resistance of the printed faces in water. The evaluation criteria are as follows:

5: good (no ink peeled at all).
4: acceptable (ink peeled only slightly, but the printed image is still on practicable level).
3: acceptable (less than 25% peeled).
2: unacceptable (from 25% to 75% peeled).
1: unacceptable (more than 75% peeled).

[Evaluation of Electrostatic Resistance]

The film is conditioned in an atmosphere at a temperature of 23° C. and a relative humidity of 50% for 2 hours or more, and then the intrinsic surface resistivity (Ω) of the coated face of the film is measured with an insulation tester "DSM-8103" (Toa Denpa Kogyo's trade name).

The test data of the films of Examples 1 to 12 and Comparative Examples 1 to 3 are all given in Table 1.

TABLE 1

| | | Example 1 | Example 2 | Example 3 | Example 4 | Example 5 | Example 6 | Example 7 |
|---|---|---|---|---|---|---|---|---|
| Type of Surface Layer | Composition | a' | a' | a' | a' | a' | a' | a' |
| Surface Layer Composition (wt. %) | Propylene homopolymer | 90 | 90 | 90 | 90 | 90 | 90 | 90 |
| | Maleic Anhydride-Modified Polypropylene | 10 | 10 | 10 | 10 | 10 | 10 | 10 |
| | Maleic Anhydride-Modified High-Density Polyethylene | 0 | 0 | 0 | 0 | 0 | 0 | 0 |
| | Maleic Anhydride-Modified Ethylene-Vinyl Acetate Copolymer | 0 | 0 | 0 | 0 | 0 | 0 | 0 |
| | Calcium Carbonate | 0 | 0 | 0 | 0 | 0 | 0 | 0 |
| | Acid Content (wt. %) | 0.05 | 0.05 | 0.05 | 0.05 | 0.05 | 0.05 | 0.05 |
| Oxidation Treatment | Corona Treatment | yes | yes | yes | yes | yes | yes | yes |
| Surface Modifier | G1 | 100 | — | — | 50 | — | — | 34 |
| | G2 | — | 100 | — | — | 50 | — | — |
| | G3 | — | — | 100 | — | — | 50 | — |
| | G4 | — | — | — | — | — | — | — |
| | G5 | — | — | — | 50 | 50 | 50 | 33 |
| | G6 | — | — | — | — | — | — | 33 |
| | G7 | — | — | — | — | — | — | — |
| Test Result | Interlayer Adhesiveness | 2.5 | 2.4 | 2.5 | 2.7 | 2.7 | 2.4 | 2.4 |
| | Ink Transferability | 1.9 | 2.0 | 1.9 | 1.8 | 1.9 | 1.9 | 2.0 |
| | Ink Adhesiveness (kg · cm) | 2.6 | 2.4 | 2.5 | 2.5 | 2.5 | 2.4 | 2.4 |
| | Evaluation of Water Resistance | 3 | 4 | 4 | 5 | 5 | 5 | 5 |
| | Intrinsic Surface Resistivity (ohm) | $1 \times 10^{14}$ | $1 \times 10^{14}$ | $1 \times 10^{14}$ | $1 \times 10^{11}$ | $1 \times 10^{11}$ | $1 \times 10^{11}$ | $1 \times 10^{11}$ |

| | | Example 8 | Example 9 | Example 10 | Example 11 | Example 12 | Comparative Example 1 | Comparative Example 2 | Comparative Example 3 |
|---|---|---|---|---|---|---|---|---|---|
| Type of Surface Layer | Composition | a' | d' | e' | f' | g' | a' | h' | i' |
| Surface Layer Composition (wt. %) | Propylene homopolymer | 90 | 95 | 45 | 90 | 90 | 90 | 55 | 100 |
| | Maleic Anhydride-Modified Polypropylene | 10 | 5 | 10 | 0 | 0 | 10 | 0 | 0 |
| | Maleic Anhydride-Modified High-Density Polyethylene | 0 | 0 | 0 | 10 | 0 | 0 | 0 | 0 |
| | Maleic Anhydride-Modified Ethylene-Vinyl Acetate Copolymer | 0 | 0 | 0 | 0 | 10 | 0 | 0 | 0 |
| | Calcium Carbonate | 0 | 0 | 45 | 0 | 0 | 0 | 45 | 0 |
| | Acid Content (wt. %) | 0.05 | 0.025 | 0.05 | 0.05 | 0.05 | 0.05 | 0 | 0 |

TABLE 1-continued

| | | | | | | | | | |
|---|---|---|---|---|---|---|---|---|---|
| Oxidation Treatment | Corona Treatment | yes | yes | yes | yes | yes | no | yes | yes |
| Surface Modifier | G1 | — | 100 | 100 | 100 | 100 | 100 | 100 | 100 |
| | G2 | — | — | — | — | — | — | — | — |
| | G3 | — | — | — | — | — | — | — | — |
| | G4 | 50 | — | — | — | — | — | — | — |
| | G5 | — | — | — | — | — | — | — | — |
| | G6 | — | — | — | — | — | — | — | — |
| | G7 | 50 | — | — | — | — | — | — | — |
| Test Result | Interlayer Adhesiveness | 2.4 | 2.4 | 1.5 | 2.3 | 2.5 | — | 0.9 | 1.5 |
| | Ink Transferability | 2.0 | 2.0 | 1.9 | 2.0 | 1.9 | — | 1.8 | 1.9 |
| | Ink Adhesiveness (kg · cm) | 2.4 | 2.3 | 1.5 | 2.6 | 2.4 | — | 0.4 | 0.3 |
| | Evaluation of Water Resistance | 5 | 3 | 3 | 3 | 3 | — | 1 | 1 |
| | Intrinsic Surface Resistivity (ohm) | $1 \times 10^{11}$ | $1 \times 10^{14}$ | $1 \times 10^{14}$ | $1 \times 10^{14}$ | $1 \times 10^{14}$ | — | $1 \times 10^{14}$ | $1 \times 10^{14}$ |

Industrial Applicability

According to the invention, thermoplastic resin films can be produced that have good adhesiveness between the film substrate and the coating layer thereof and have good printability and electrostatic resistance. The thermoplastic resin films produced according to the method of the invention are useful for prints, posters, stickers, decorations, etc.

The present disclosure relates to the subject matter contained in Japanese Patent Application No. 051543/2002 filed on Feb. 27, 2002 and International Patent Application PCT/JP03/02203 filed on Feb. 27, 2003, which are expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A method for producing a thermoplastic resin film, comprising:
    providing a polyolefin-based thermoplastic resin film (i) which is a multi-layered resin film comprising a substrate layer (ii) and a surface layer (iii) formed over at least one face of the substrate layer (ii);
    oxidizing a surface of the polyolefin-based thermoplastic resin film (i);
    applying a surface modifier to the surface of the polyolefin-based thermoplastic resin film (i); and
    stretching the polyolefin-based thermoplastic resin film (i), wherein the substrate layer (ii) comprises from 40 to 99.5% by weight of a polyolefin-based thermoplastic resin and from 0.5 to 60% by weight of inorganic fine powder, the surface layer (iii) comprises an unsaturated carboxylic acid-modified polyolefin-based thermoplastic resin in an amount of 10% or more by weight, the surface layer (iii) is free from inorganic fine powder, and a degree of modification with an unsaturated carboxylic acid of the unsaturated carboxylic acid-modified polyolefin-based resin is from 0.01 to 10% by weight.

2. The method as claimed in claim 1, wherein the providing of the polyolefin-based thermoplastic resin film (i) comprises stretching the substrate layer (ii) in a machine direction.

3. The method as claimed in claim 1, wherein the unsaturated carboxylic acid of the unsaturated carboxylic acid-modified polyolefin-based thermoplastic resin is one or a mixture of two or more selected from the group consisting of acrylic acid, methacrylic acid, maleic acid, fumaric acid, itaconic acid, maleic anhydride and itaconic anhydride.

4. The method as claimed in claim 3, wherein the unsaturated carboxylic acid of the unsaturated carboxylic acid-modified polyolefin-based thermoplastic resin is maleic acid or maleic anhydride.

5. The method as claimed in claim 1, wherein a polyolefin-based resin of the unsaturated carboxylic acid-modified polyolefin-based thermoplastic resin is one or a mixture of two or more selected from the group consisting of polyethylene, polypropylene, polybutene-1, ethylene-vinyl acetate copolymer and ethylene-propylene copolymer.

6. The method as claimed in claim 5, wherein the polyolefin-based resin of the unsaturated carboxylic acid-modified polyolefin-based thermoplastic resin is polypropylene.

7. The method as claimed in claim 1, wherein an acid content of the polyolefin-based thermoplastic resin film (i), represented by the following formula, is from 0.01 to 1.0% by weight:

Acid Content (wt. %) =M×S/100, wherein,
    M indicates an unsaturated carboxylic acid-modified polyolefin content (wt. %) of the polyolefin-based thermoplastic resin film (i), and
    S indicates the degree of modification with the unsaturated carboxylic acid (wt. %).

8. The method as claimed in claim 1, wherein an acid content of the surface layer (iii), represented by the following formula, is from 0.01 to 1.0% by weight:

Acid Content (wt. %) =H×S/100, wherein,
    H indicates an unsaturated carboxylic acid-modified polyolefin content (wt. %) of the surface layer (iii), and
    S indicates the degree of modification with the unsaturated carboxylic acid (wt. %).

9. The method as claimed in claim 1, wherein the polyolefin-based thermoplastic resin of the substrate layer (ii) is a propylene-based resin.

10. The method as claimed in claim 1, wherein the oxidizing is performed by at least one treatment selected from the group consisting of a corona-discharging treatment, a flame treatment, a plasma treatment, a glow-discharging treatment and an ozone treatment.

11. The method as claimed in claim 1, wherein the surface modifier comprises one or more polymer binders selected from the group consisting of a polyethylenimine polymer, a polyurethane polymer, a polyacrylate copolymer and a polyester copolymer.

12. The method as claimed in claim 1, wherein the surface modifier comprises an antistatic polymer.

13. The method as claimed in claim 1, wherein the polyolefin-based thermoplastic resin film (i) comprises the unsaturated carboxylic acid-modified polyolefin based thermoplastic resin in an amount of 10% to 80%.

14. The method as claimed in claim 1, wherein the surface modifier comprises a polyethyleneimine polymer.

15. The method as claimed in claim 1, wherein the surface modifier comprises a polyurethane polymer.

16. The method as claimed in claim 1, wherein the surface modifier comprises a polyacrylate copolymer.

17. The method as claimed in claim 1, wherein the polyolefin-based thermoplastic resin of the substrate layer (ii) is a propylenic resin.

* * * * *